(12) United States Patent
Keller (10) Patent No.: US 12,306,203 B2
(45) Date of Patent: May 20, 2025

(54) CLASSIFYING LIQUID HANDLING PROCEDURES WITH A NEURAL NETWORK

(71) Applicant: TECAN TRADING AG, Männedorf (CH)

(72) Inventor: Michael Keller, Bauma/ZH (CH)

(73) Assignee: TECAN TRADING AG, Männedorf (CH)

( * ) Notice: Subject to any disclaimer, the term of this patent is extended or adjusted under 35 U.S.C. 154(b) by 947 days.

(21) Appl. No.: 17/296,480

(22) PCT Filed: Dec. 10, 2019

(86) PCT No.: PCT/EP2019/084484
§ 371 (c)(1),
(2) Date: May 24, 2021

(87) PCT Pub. No.: WO2020/126694
PCT Pub. Date: Jun. 25, 2020

(65) Prior Publication Data
US 2022/0026455 A1    Jan. 27, 2022

(30) Foreign Application Priority Data

Dec. 18, 2018 (EP) .................................... 18213361

(51) Int. Cl.
*G01N 35/10* (2006.01)
(52) U.S. Cl.
CPC ................. *G01N 35/1016* (2013.01)
(58) Field of Classification Search
CPC ............... G01N 35/1016; G01N 2035/1018
USPC .......................................................... 703/9
See application file for complete search history.

(56) References Cited

U.S. PATENT DOCUMENTS

| 5,565,364 | A | 10/1996 | Schaefer et al. |
| 6,502,042 | B1* | 12/2002 | Eid ........... G01F 23/802 702/50 |
| 9,335,335 | B2 | 5/2016 | Mimura et al. |
| 10,062,028 | B2 | 8/2018 | Harvey |
| 11,320,443 | B2 | 5/2022 | Umeki et al. |
| 2004/0034479 | A1 | 2/2004 | Shimase et al. |
| 2008/0195650 | A1* | 8/2008 | Lingenfelder ......... G06N 20/00 707/999.102 |

(Continued)

FOREIGN PATENT DOCUMENTS

| CN | 1082715 A | 2/1994 |
| CN | 1441896 A | 9/2003 |

(Continued)

OTHER PUBLICATIONS

Couteau, Olivier (EP Authorized Officer), International Search Report and Written Opinion mailed Feb. 2, 2020, 12 pages.

(Continued)

*Primary Examiner* — Brian S Cook
(74) *Attorney, Agent, or Firm* — MH2 Technology Law Group LLP (57) ABSTRACT

A method for classifying liquid handling procedures comprises includes receiving measurement data encoding a measurement curve of measurements over time during at least a part of a liquid handling procedure; inputting the measurement data into a neural network; and calculating at least one quality value for the liquid handling procedure with the neural network.

14 Claims, 6 Drawing Sheets

(56) References Cited

U.S. PATENT DOCUMENTS

| | | | |
|---|---|---|---|
| 2013/0298696 | A1 | 11/2013 | Singfield |
| 2018/0044159 | A1* | 2/2018 | Crouse .................... F17C 13/02 |
| 2018/0096243 | A1* | 4/2018 | Patil ....................... G06N 3/084 |
| 2018/0253647 | A1 | 9/2018 | Yu et al. |
| 2020/0057880 | A1* | 2/2020 | Mizutani ............... G06T 7/0014 |
| 2021/0286604 | A1* | 9/2021 | Peccoud .................. G06F 8/35 |

FOREIGN PATENT DOCUMENTS

| | | | |
|---|---|---|---|
| EP | 1391734 | A2 | 2/2004 |
| JP | 2004125780 | A | 4/2004 |
| JP | 201444174 | A | 3/2014 |
| JP | 2018105690 | A | 7/2018 |
| WO | 2002006774 | A2 | 1/2002 |
| WO | 2018163744 | A1 | 9/2018 |

OTHER PUBLICATIONS

Rahhal et al., "Learning a Multi-Branch Neural Network from Multiple sources for Knowledge Adaptation in Remote Sensing Imagery," Remote Sens. 2018, 10, 1890, 18 pages.

Unver et al., "A Fuzzy Quality Control-Decision Support System for Improving Operational Reliability of Liquid Transfer Operations in Laboratory Automation," Expert Systems with Applications 36 (2009) 8064-8070.

Couteau, Oliver (EP Examiner), Extended European Search Report issued Jun. 20, 2022 in corresponding European Application No. 22161055.3, 8 pages.

Li et al., "Designing Deep Learning Model for Accurate vNF Service Chain Pre-deployment in Inter-DC EONs," 2018 Asia Communications and Photonics Conference (ACP), 3 pages.

Chinese Office Action issued Dec. 7, 2024 in corresponding Chinese Application No. 201980068243.X, 15 pages, including English translation.

Japanese Decision to Grant issued Feb. 18, 2025 in corresponding Japanese Application No. 2023-211351, 6 pages, including English translation.

* cited by examiner

CLASSIFYING LIQUID HANDLING PROCEDURES WITH A NEURAL NETWORK

CROSS-REFERENCE TO RELATED APPLICATION(S)

This application is a U.S. National Stage of International Application No. PCT/EP2019/084484 filed Dec. 10, 2019, published as WO 2020/126694 A1 on Jun. 25, 2020, which claims the benefit of and priority to European Patent Application No. 18213361.1, filed Dec. 18, 2018, the entire contents of all of which are incorporated by reference herein.

FIELD OF THE INVENTION

The invention relates to a method, a computer program and a computer-readable medium for classifying liquid handling procedures as well as to a laboratory automation system.

BACKGROUND OF THE INVENTION

Laboratory automation systems are used for automating tasks of a laboratory assistant, which, for example, tests a patient for specific diseases. Usually, a sample of the patient's blood, urine, stool, etc. is taken and analyzed by means of a bio-chemical procedure. Such a procedure consists in various operations like adding substances, incubating, separating, etc. and a measurement process which quantitatively or qualitatively measures the amount or presence of a substance indicating the specific disease.

An important part of a laboratory automation system is the liquid handling system, which usually comprises one or more pipettes, which may be moved around in three dimensions and which may automatically aspirate liquids from cavities and dispense the liquids into other cavities. The automated movement of liquids between different cavities with a pipette may be called pipetting procedure. A liquid handling system may also comprise a one or more dispense cannulas which may be part of dispenser module placed on the workface of the laboratory system or which may be moved around in three dimensions and which may automatically dispense liquids from a reservoir into cavities. The term "dispense" is understood either as dispensing liquid e.g. reagents or diluents from a reservoir fluidically connected to a dispense tip or as dispensing liquid from a pipetting tip into a cavity subsequent to an aspiration from another cavity.

Process security is increasingly important for automated liquid handling systems. Therefore, new air pipettors typically measure the air pressure during the liquid transfers. The classification of such signals is usually not easy, because there is a plurality of influence parameters, which have an effect on the pipetting procedure, such as liquid parameters, dynamic parameters, system and pipette tip parameters, environmental parameters, etc.

There are several methods, how the measurement data from a pressure sensor may be evaluated.

As an example, an ideal pressure curve may be determined based on many correct pipetting procedures. The pipetting procedure may be evaluated by comparing the measured pressure curve with the ideal pressure curve, which may deviate only a predefined percentage from the ideal pressure curve, for a correct pipetting procedure. However, for every volume, sample, tip type combination, ideal pressure curves may have to be stablished.

As a further example, a theoretical pressure curve may be determined based on pipetting, sample and environmental parameters. After a pipetting procedure, the theoretical pressure curve may be fitted to the measured pipetting curve. Fitting parameters then may be evaluated. Based on the evaluation, the liquid transfer (i.e. the pipetting procedure) may be rated as correct or incorrect. However, in this case, a theoretical model may have to be determined for the complete liquid handling system. Furthermore, the model may be adapted and verified for each tip type, sample type and liquid handling system combination.

EP 1 745 851 A1 describes a pipetting device adapted for the classification of a liquid, which is based on comparing simulation curves with measured curves.

In WO 2012 068 610 A1, a density of a fluid is inferred by using a measured pressure as an input to a trained neural network.

US 2004/034 479 A1 and EP 1 391 734 A2 relate to a sample dispensing apparatus and automatic analyzer, which uses a neuronal network for analyzing waveforms of pressure fluctuations.

In the article by Unver et al., "A fuzzy quality control-decision support system for improving operational reliability of liquid transfer operations in laboratory automation", Expert Systems with Applications, vo. 36, no. 4, 14 Nov. 2018, pages 8064-8070, fuzzy logic is used for performing quality control in liquid transfer operations.

DESCRIPTION OF THE INVENTION

It is an objective of the invention to simplify the configuration and/or control of a laboratory automation system.

This objective is achieved by the subject-matter of the independent claims. Further exemplary embodiments are evident from the dependent claims and the following description.

A first aspect of the invention relates to a method for classifying liquid handling procedures. The method may be performed automatically, for example by a control device of a laboratory automation system. A liquid handling procedure may be a pipetting procedure, a part of a pipetting procedure and/or a dispensing procedure. The automated movement of liquids between different cavities with a pipette performed by a laboratory automation device may be called pipetting procedure. The automated dispensing of liquids with a pipette and/or with a dispense cannula performed by a laboratory automation device may be called dispensing procedure. A dispensing procedure may be a part of a pipetting procedure.

According to an embodiment of the invention, the method comprises: receiving measurement data encoding a measurement curve of measurements over time during a liquid handling procedure. The measurement data may comprise liquid handling relevant sensor data, such as pressure measurements and/or flow measurements, for example of a liquid and/or a gas.

Measurements relating to a fill level of a pipette tip and/or a vessel also may be possible. For example, an aspirated volume may be measured by capacitive sensing within the pipette tip. A volume change in the source or destination cavity may be measured by sensing the liquid level before and after the aspirate or dispense and the volume difference may be calculated by using known cross section of the cavity.

The measurement data may be acquired with a sensor of the laboratory automation system. For example, a pressure and/or a flow rate in a gas and/or liquid in a line to a pipette of the laboratory automation system may be measured. The measurements may be performed in a volume connected to the pipette and/or dispense cannula, in which the pressure is changed for performing the liquid handling procedure.

A pump may apply a pressure applied to the line and with this applied pressure, the aspiration and dispensing of liquids with the pipette tip may be controlled. The applied pressure and the flowing liquid in the pipette may cause a different pressure in the line and/or a flow inside the line.

According to an embodiment of the invention, the method further comprises: inputting the measurement data into an (artificial) neural network; and calculating at least one quality value for the liquid handling procedure with the neural network.

The neural network may be provided as software module and/or software library, which is supplemented with a parametrization that has been generated from already qualified training data. The training data may be a set of measurement data and optionally liquid handling data of a plurality of different liquid handling procedures that already have been qualified. The liquid handling data may encode a configuration and/or settings of the laboratory automation system. The training data may include one or more quality values for the respective liquid handling procedure.

The neural network may be a deep neural network, i.e. may comprise a plurality of layers, such as convolutional layers and dense layers. The neural network may comprise at least two convolutional layers and/or at least two dense layers, which are connected in a row. A definition of the different types of layers mentioned herein will be made below.

A layer may be a set of neurons, which have inputs, for example for receiving input values from a previous layer and outputs, for example for sending output values to a next layer. The neurons may have weights and a function, which dependent on the weights calculate an output value from the input values. A layer may be provided with an object of an object-oriented programming language. The number of neurons, weights and the function may be provided as parameter data, which, for example, may be encoded into the object. The parameter data may be seen as parametrization of the neural network, while the layers and their interconnection may be seen as structure of the neural network.

Measurement data from an actual measurement in the laboratory automation system may be input into a neural network, which has been trained to qualify the measurement data. This qualification may be a classification, such as a classification into successful and erroneous liquid handling procedures. The qualification also may be one or more values indicative of a physical quantity, which is present in the respective liquid handling procedure, such as an aspirated volume and/or a dispensed volume. Further possible physical quantities may be physical properties of the pipetted and/or dispensed sample liquid, such as specific density, viscosity, surface tension and/or wettability of pipette tip (and/or dispense cannula) surface by the sample.

In general, a neural network based machine learning algorithm may be used for evaluating measurement data in order to qualify and/or classify liquid transfers in a laboratory automation system. The trained neural network may be used as error detection assistant.

The neural network even may be adjusted during and/or after operation of the laboratory automation system. An error detection rate may be adjusted with respect to a wrong positive rate, qualified and/or classified measurement curve may be added to the training set. A customer using the laboratory automation system may qualify measurement curves and may improve a forecast ability of the neural network.

According to an embodiment of the invention, the method further comprises: controlling a laboratory automation system with the quality value. The method may be performed by a control device of a laboratory automation system during operation of the laboratory automation system. For example, the quality value may classify the liquid handling procedure as correct or erroneous, the quality value may indicate that the aspirated volume is too small, etc. In the case, when it is assumed that the liquid handling procedure was not correct, the assay and/or sample processed by the laboratory automation system with the liquid handling procedure may be marked as erroneous and/or may be discarded.

According to an embodiment of the invention, the method further comprises: marking the liquid handling procedure as erroneous, when the quality value is indicative of a failed liquid handling procedure and/or discarding a result of the liquid handling procedure, when the quality value is indicative of a failed liquid handling procedure.

According to an embodiment of the invention, the method further comprises: repeating an assay and/or sample processing with the liquid handling procedure, when the quality value is indicative of a failed liquid handling procedure.

According to an embodiment of the invention, the measurement data comprise a vector of timely ordered measurement values. The pressure, the flow rate and/or more general liquid handling sensor data may be measured over time, i.e. a measurement curve may be determined. The measurement data may comprise discrete measurement values of this curve over time. The measurement values may be concatenated into a timely ordered vector. Such a vector may be seen as a one-dimensional digitized image of a continuous physical quantity and therefore may be especially suited for being input into a neural network.

According to an embodiment of the invention, the method further comprises: inputting liquid handling data into the neural network, wherein the liquid handling data encode a configuration and/or setting of a laboratory automation system performing the liquid handling procedure. Besides the measurement data, also liquid handling data, i.e. data encoding properties of a laboratory automation system, such as the actually used pipette tips, may be input into the neural network. In other words, the neural network may have been trained for different configurations and/or settings of the laboratory automation system. In such a way, the same neural network may be used in different application scenarios.

The liquid handling data may comprise information with respect to the liquid, such as a density, a viscosity, and/or a type of liquid. The liquid handling data may comprise information with respect to the pipette and/or a discardable pipette tip, such as its size, its type, its maximal volume. The liquid handling data may comprise information with respect to the liquid handling procedure and/or control parameters, such as an aspiration and/or dispensing speed, an amount of liquid to be aspirated and/or dispensed, a length of aspiration and/or dispensing, control parameters of a pump, etc.

According to an embodiment of the invention, the measurement data and the liquid handling data are concatenated into one vector before being input to the neural network. The measurement data and the liquid handling data may be treated as one type of input information and/or may be input into one input layer of the neural network.

According to an embodiment of the invention, the measurement data and the liquid handling data are input into different input layers of the neural network. It also may be that the two types of data are input into different input layers, which may be even connected to different other layers of the neural network. In such a way, the two different data sets may be processed differently by differently configured layers, before they are processed by the same layers.

According to an embodiment of the invention, the neural network comprises a measurement data branch composed of at least one layer and a liquid handling data branch composed of at least one layer. The measurement data may be input into an input layer of the measurement data branch and the liquid handling data may be input into an input layer of the liquid handling data branch.

The measurement data branch may comprise at least two convolutional layers. However, it may be possible that the measurement data branch is solely one input layer. The liquid handling data branch may be solely one input layer, but also may comprise one, two or more dense layers.

According to an embodiment of the invention, the neural network comprises a dense layer branch. For example, an output of the measurement data branch and an output of the liquid handling data branch are input into the dense layer branch. The dense layer branch may comprise at least two dense layers. The dense layer branch may comprise a probability layer at its end, which generates probability values for different classification types.

In general, a plurality of quality values may be output by the neural network, and in particular the dense layer branch. Such quality values may comprise classification values, which may be percentage values indicating a probability of a specific classification type. Such quality values also may be estimation values, which estimate specific physical quantities that may arise during the liquid handling procedure.

According to an embodiment of the invention, the neural network outputs a classification value, classifying the liquid handling procedure. For example, the classification value may indicate at least one of: correct procedure, clot, air aspiration, short sample, bubbles, foam, blocked tip, leakage, etc. All or some types of problems, which may occur during a liquid handling procedure, may be classified. It also may be that the classification is restricted to simply indicating, whether the procedure was correctly performed or not.

According to an embodiment of the invention, the neural network outputs an estimation value, estimating a physical quantity of the liquid handling procedure. For example, the estimation value estimates at least one of a dispensed volume and an aspirated volume. The neural network may be trained as a model of the laboratory automation system, which outputs physical quantities, which can be determined from the measurement data. It is not necessary to determine a model, which is based on mathematical functions encoding physical relationships.

According to an embodiment of the invention, the liquid handling procedure comprises lowering a pipette into a cavity containing a liquid. The pressure, the flow rate and/or liquid handling sensor data already may be measured during the lowering of the pipette into the liquid, i.e. before a pump starts to work.

According to an embodiment of the invention, the liquid handling procedure comprises: aspirating the liquid into the pipette by lowering a pressure in the pipette, and/or dispensing a liquid in the pipette by raising a pressure in the pipette. The pressure may be lowered and/or raised by a pump connected to the pipette. The measurement data may comprise measurements during an aspiration of a liquid into the pipette and/or the measurement data may comprise measurements during a dispensing of a liquid from the pipette.

It has to be noted that the qualification by the neural network may be performed solely for the aspiration, solely for the dispensing and/or for both.

A further aspect of the invention relates to a computer program for classifying liquid handling procedures, which, when being executed by a processor, is adapted to carry out the steps of the method as described in the above and in the following. The computer program may be executed in a computing device, such as a controller of the laboratory automation system and/or such as a PC, communicatively interconnected with the laboratory automation system. It also is possible that the method is performed by an embedded microcontroller.

A further aspect of the invention relates to a computer-readable medium, in which such a computer program is stored. A computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. In general, the computer-readable medium may be a non-transitory or transitory medium.

A further aspect of the invention relates to a laboratory automation system.

According to an embodiment of the invention, the laboratory automation system comprises a liquid handling arm for carrying a pipette and/or a dispense cannula, a pump for changing a pressure in a volume connected to the pipette for aspirating and dispensing a liquid in the pipette, a sensor device for performing measurements in a volume connected to the pipette, and a control device for controlling the pump and for receiving measurement data from the sensor device.

The measurements may be any measurements relating to the liquid handling procedure, such as pressure, flow, volume change measurements, etc. The measurement data may be or may comprise liquid handling sensor data.

Furthermore, the control device may be adapted for performing the method as described in the above and in the below. The control device may store the neural network as described in the above and in the below.

It has to be understood that features of the method as described in the above and in the following may be features of the control device, the computer program and the computer-readable medium as described in the above and in the following and vice versa.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
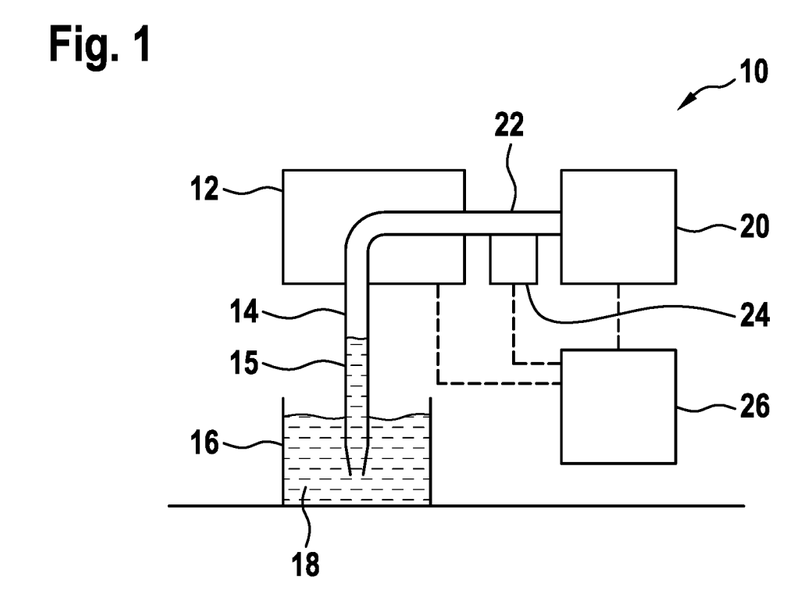
FIG. 1 schematically shows a laboratory automation system according to an embodiment of the invention.

FIG. 1 schematically shows a laboratory automation system 10, which comprises an automatically movable pipette arm 12 to which a pipette 14 is attached. The pipette 14 also may comprise a discardable pipette tip 15, which also may be gripped and discarded by the pipette arm 12. As shown in FIG. 1, the pipette tip 15 is lowered into a container 16. The container 16 may be a well of a multi-well plate, a test tube with a sample, a container with a reagent, etc.

The pipetting arm 12 may move the pipette 14 and the pipette tip 15 in three dimensions and may lower the pipette tip 15 into containers 16 and may retract the pipette tip therefrom. The container 16 and possibly the pipette tip 15 may contain a liquid 18, such as a sample or a reagent. The pipette 14 and its tip 15 is used for moving and/or transporting an amount of the liquid between different containers 16.

The laboratory automation system 10 also may comprise dispense cannulas, which also may be connected to the pipetting arm 12, which in this case also may be seen as liquid handling arm. The dispense cannulas may be connected to a reservoir and may be used for dispensing liquids into containers 16.

The laboratory automation system 10 furthermore comprises a pump 20, which is connected via a hose 22 with the pipette 14. With the pump 20, a pressure may be applied to the hose 22 and to the pipette 14, which causes the pipette 14 to aspirate or dispense liquid 18.

A sensor device 24, which may be attached to the hose 22 and/or the pipette 14, is adapted for measuring a pressure and/or a flow rate in the hose 22 and/or the pipette 14. The measurement data acquired by the sensor device 24 may be used for qualifying a pipette procedure as described herein.

A control device 26 of the laboratory automation system 10, which may be a part of the laboratory automation system 10 or connected thereto, may control the pipetting arm 12, the pump 20 and may receive measurement data from the sensor device 24.

Figure 2:
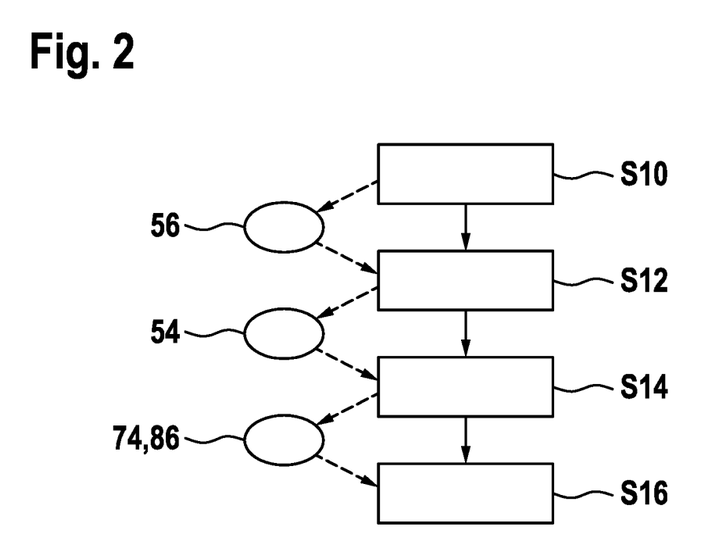
FIG. 2 shows a flow diagram for a method for classifying liquid handling procedures according to an embodiment of the invention.

FIG. 2 shows a flow diagram for a method for classifying liquid handling procedures, which may be performed by the control device 26.

In step S10, measurement data 56 is generated. In general, a sensor device 24 of the laboratory automation system 10 may measure a pressure and/or a flow rate over time and may generate a measurement curve from this. During the measurement, measurement values may be acquired over time and sent to the control device 26.

Figure 3:
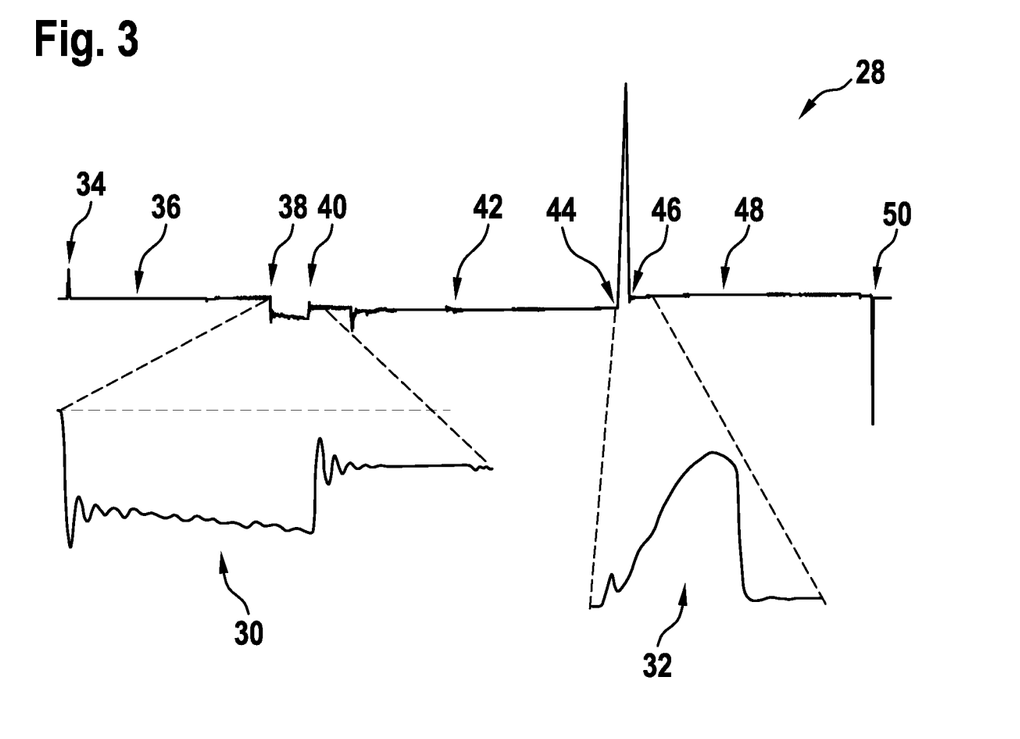
FIG. 3 shows a measurement curve during a pipetting procedure.

FIG. 3 shows a measurement curve 28, in particular a pressure curve 28, during a pipetting procedure. It has to be noted that everything discussed in the following with respect to pressure curves and pressure measurements also applies to flow rate curves and flow rate measurements. Also, everything discussed in the following may relate to dispensing procedures performed with dispense cannulas, when applicable.

The generation of measurement data 56 in step S10 may be performed in parallel to a control of the laboratory automation system 10, which also may be performed by the control device 26.

In general, liquid 18 is transported between two cavities 16 by aspirating the liquid 18 into the pipette 14 by lowering a pressure in the pipette 14. This may be done by controlling the pump 20 appropriately. After that, the liquid 18 in the pipette 14 is dispensed by raising a pressure in the pipette 14, which also may be performed by controlling the pump 20 appropriately. Before, between and after the aspiration and the dispensing, the pipette 14 may be moved by the pipetting arm 12 to a first cavity 16 and to a second cavity 16.

The pressure curve 28 in FIG. 3 shows the measured pressure from gripping a pipette tip 15 to dropping the pipette tip 14 in the end, where time is running from left to right. In particular, an aspiration curve 30 and a dispension curve 32 are shown enlarged.

In the beginning, the pipette tip 15 is gripped (34) and a movement (36) of the pipette arm 12 to the first cavity 16 is performed. At (38), the aspiration starts. It can be seen that the pressure is lowered, which causes an underpressure in the pipette tip 15 to aspirate liquid 18. At (40), the aspiration ends and the pressure returns to a mean value. After that, a further movement (42) of the pipette arm 12 to the second cavity 16 is performed. At (44), the dispensing of the liquid 18 starts and at (46), the dispensing ends. As can be seen, here the pressure is increased, such that the overpressure in the pipette tip 15 dispenses the liquid 18. In the end, a movement (48) of the pipette arm 12 to a waste container is performed, where the pipette tip 15 is dropped (50).

During a correct aspiration (30) and dispensing (32), the pressure curve looks like in FIG. 3. However, errors during the aspiration and/or the dispensing (32) causes differently shaped pressure curves.

Figure 4:
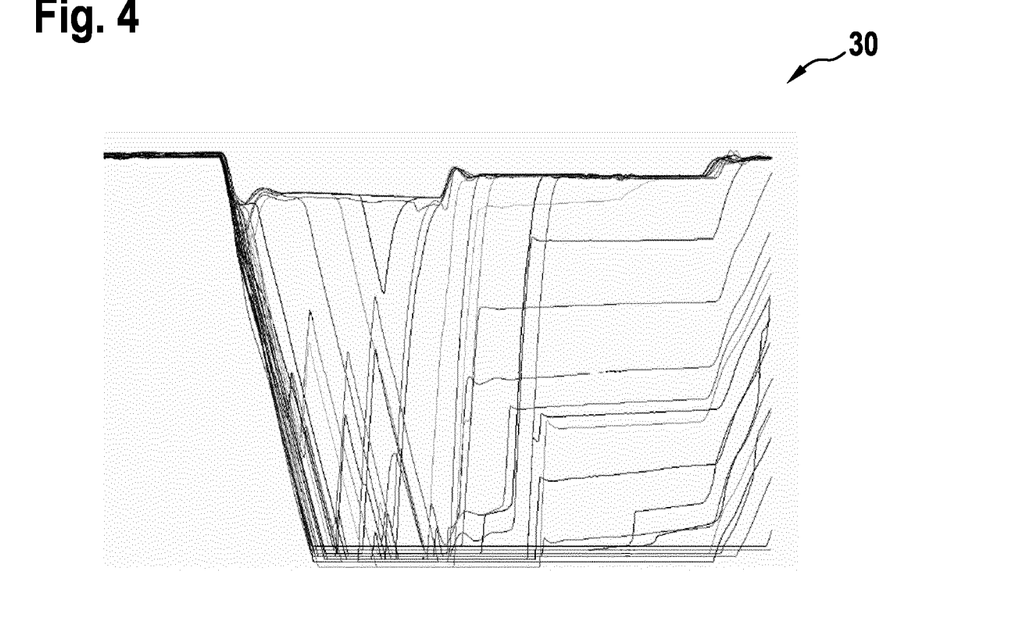
FIG. 4 shows a plurality of measurement curves during pipetting procedures with a clot.
Figure 5:
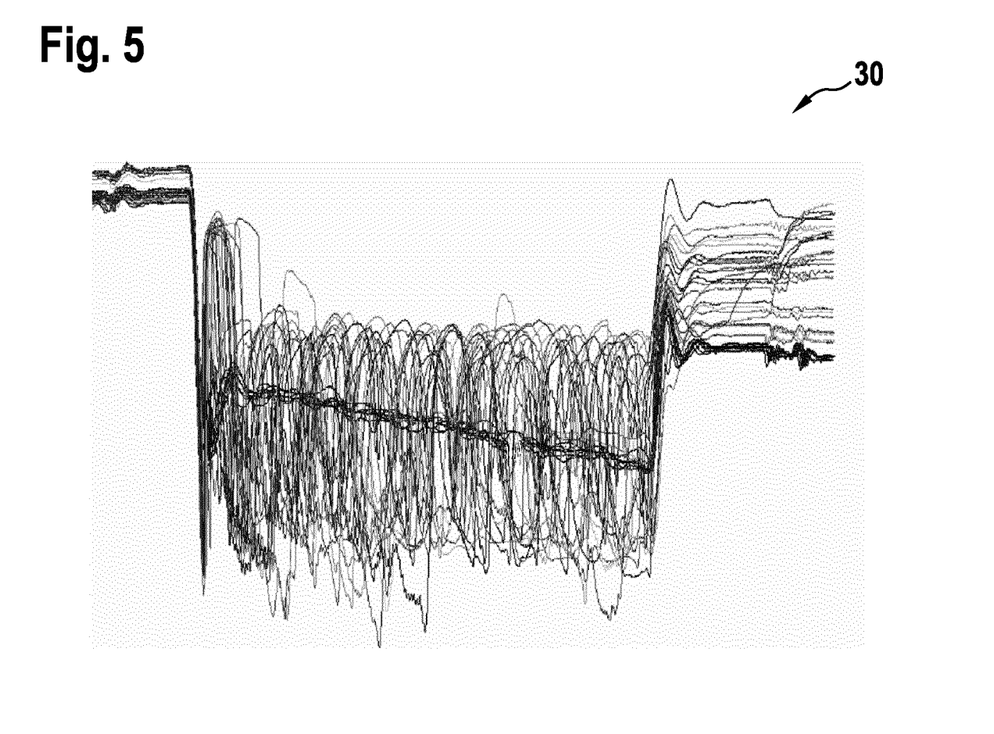
FIG. 5 shows a plurality of measurement curves during a pipetting procedure with bubbles.

As examples, FIGS. 4 and 5 show aspiration curves 30, where the pipetting procedure was not performed correctly. In particular, FIG. 4 shows a plurality of aspiration curves 30 during pipetting procedures with a clot. It can be seen that these curves all deviate from the optimal curve as shown in FIG. 3 somehow in the same way. FIG. 5 shows a plurality of aspiration curves 30 during a pipetting procedure with bubbles. Again it can be seen that these curves deviate from the optimal curve as shown in FIG. 3 in the same way.

Returning to FIG. 2, in step S12, the measurement data 56 encoding the measurement curve 28, 30 and/or 32 of measurements over time during the pipetting procedure are received in the control device 26.

The control device 26 may generate a data structure in the form of a vector from the measurement values, where the measurement values are timely ordered. Furthermore, the data vector may be supplemented with further data, such as configuration parameters and/or parameter settings of the laboratory automations system 10.

Figure 6:
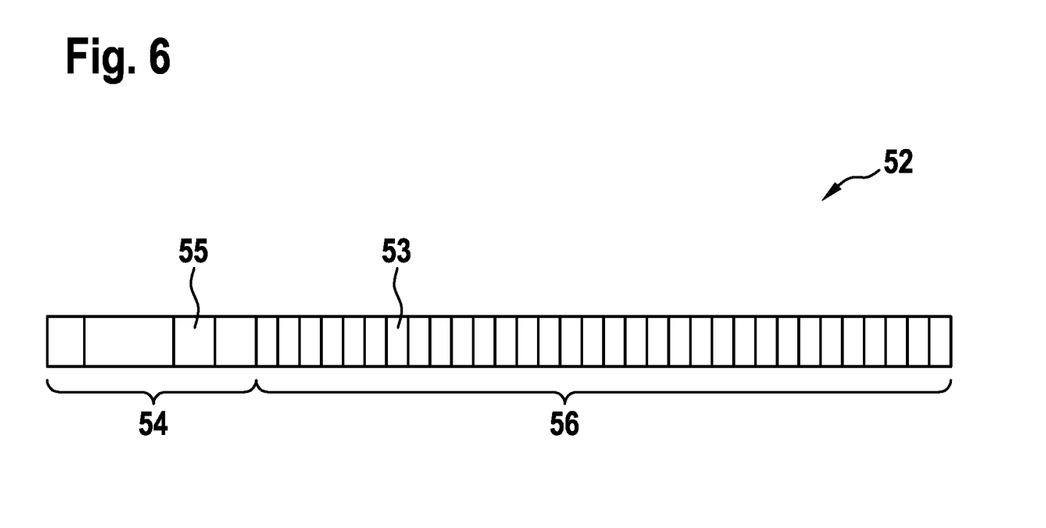
FIG. 6 schematically shows an input vector for a neural network used in an embodiment of the invention.

FIG. 6 schematically shows a data vector 52 that may be generated by the control device 26. The data vector 52 is composed of liquid handling data 54 and measurement data 56.

The liquid handling data 54 may be composed of configuration parameters and/or settings 55, which, for example, may depend on the actual performed type of liquid handling procedure, the used type of pipette tip 15, the type of liquid 18, etc. The control device 26 may assemble such data and may put it into the data vector 52.

It has to be noted that the entries and/or values 55 in the liquid handling data 54 may be of different size and/or different format.

The measurement data 56 may be composed of measurement values 53. It may be possible that the measurement data 56 is pre-processed by the control device 26, for example to fit into a data vector 52 of a specific length.

The measurement data 56 may be arranged as a vector 52 of timely ordered measurement values 53, i.e. the higher the index of the measurement value 53, the higher the time, it was acquired.

Returning to FIG. 2, in step S14, the measurement data 56 and optionally the liquid handling data 54 are input into a neural network and at least one quality value 74, 86 is calculated for the liquid handling procedure with the neural network. Examples of neural networks will be described with respect to FIGS. 7 to 9.

Figure 7:
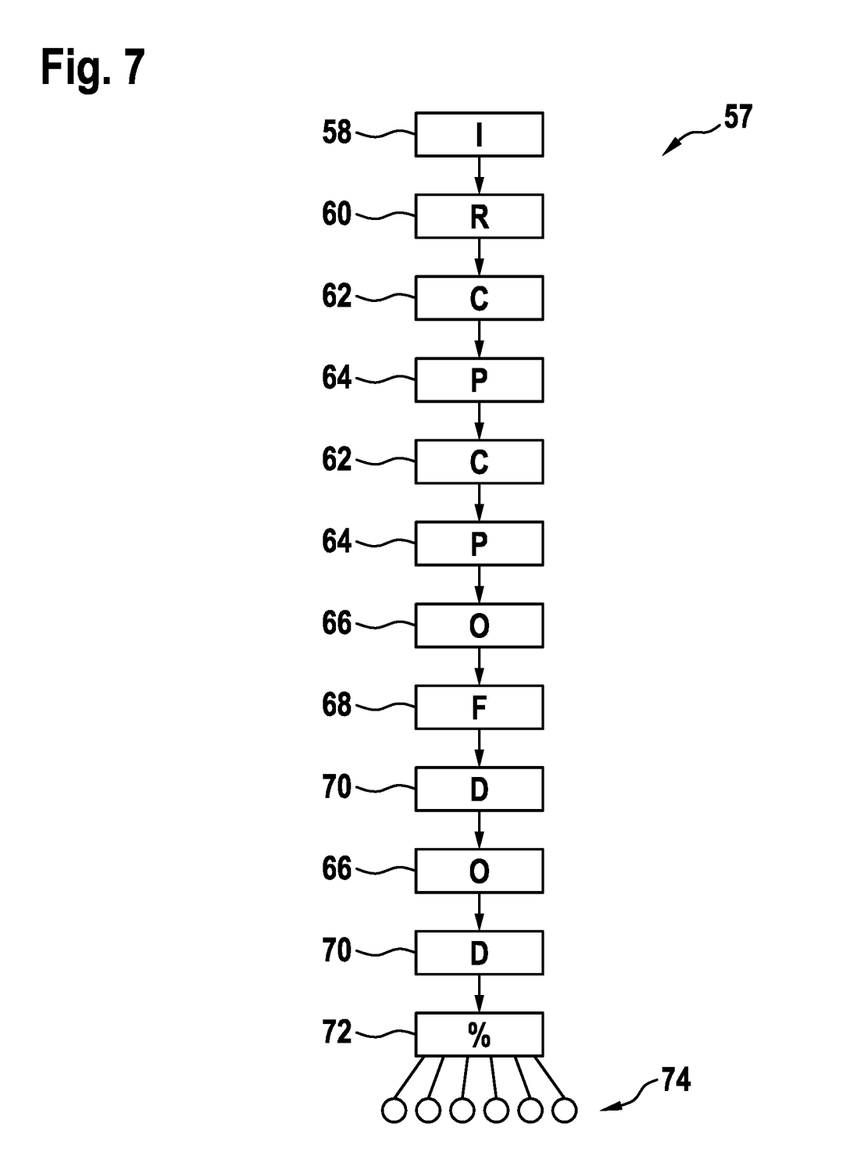
FIG. 7 schematically shows a layout of a neural network used in an embodiment of the invention.

For example, FIG. 7 schematically shows a layout and/or structure of a neural network 57 used in an embodiment of the invention. In FIG. 7, the layout is a row of concatenated layers 58 to 72, each of which is composed of a set of neurons.

It has to be noted that the neural network 57, besides its layouts also comprise a configuration/parametrization for its layers, such as the number of neurons and/or a number of inputs and/or number of outputs for each neuron. Furthermore, each layer also comprises weights for its inputs and functions for its outputs, which based on the weights calculate the respective output values.

The weights may be determined during training of the neural network 57, which is provided with a large number of already qualified training data sets, such as the curves 28, 30, 32 as shown in FIGS. 3 to 5 optionally together with corresponding liquid handling data. This, for example, may be done by back-propagation.

In the example of FIG. 7, the measurement data 56 and the liquid handling data 54 may be concatenated into one vector 52, for example as shown in FIG. 6, before being input to the neural network 57. However, it is also possible that only a vector of measurement data 56 is input in the neural network 57. This may be the case, when the neural network has been trained for only one configuration and/or type of liquid handling procedure.

The neural network 57 of FIG. 7 comprises (in this order) an input layer 58, a reshape layer 60, a number of pairs of a convolutional layer 62 and a pooling layer 64, a dropout layer 66, a flatten layer 68, a number of dense layers 70 and a probability layer 72. Further dropout layers 66 may be arranged between the dense layers 70.

An input layer 58 receives a vector of input data (such as measurement data 56 and/or liquid handling data 54) and/or preprocesses the input data in a first step.

The reshape layer 60 changes the dimensionality of the output data with respect to the input data. The reshape layer 60 may not be necessary, if a correct format is directly provided.

A convolutional layer 62 creates feature maps by applying one or more filters (also known as kernels) to local receptive fields of the input data. In the present case, the output of the reshape layer and/or the local receptive fields may be one-dimensional.

A pooling layer 64 is a layer condensing information from the previous layer, for example by taking the maximum of a region.

A dropout layer 66 removes some of the feedback information during training to generalize learning. One, some or all of the dropout layers may be optional to increase the generality of the prediction.

A flatten layer 68 converts multidimensional data to one-dimensional data.

A dense layer 70 is a layer with full one to one connection to the previous layer.

A probability layer is a layer, which determines probability values for classifiers from unnormalized inputs. A probability layer may be a dense layer with a softmax activation function normalizing the output so it sums up to 1.

In the end, the neural network 57 outputs one or more classification values 74, which are probability values classifying the liquid handling procedure. For example, the classification values 74 may indicate a correct procedure, a clot, air aspiration, a short sample, bubbles, foam, a blocked tip, leakage.

Figure 8:
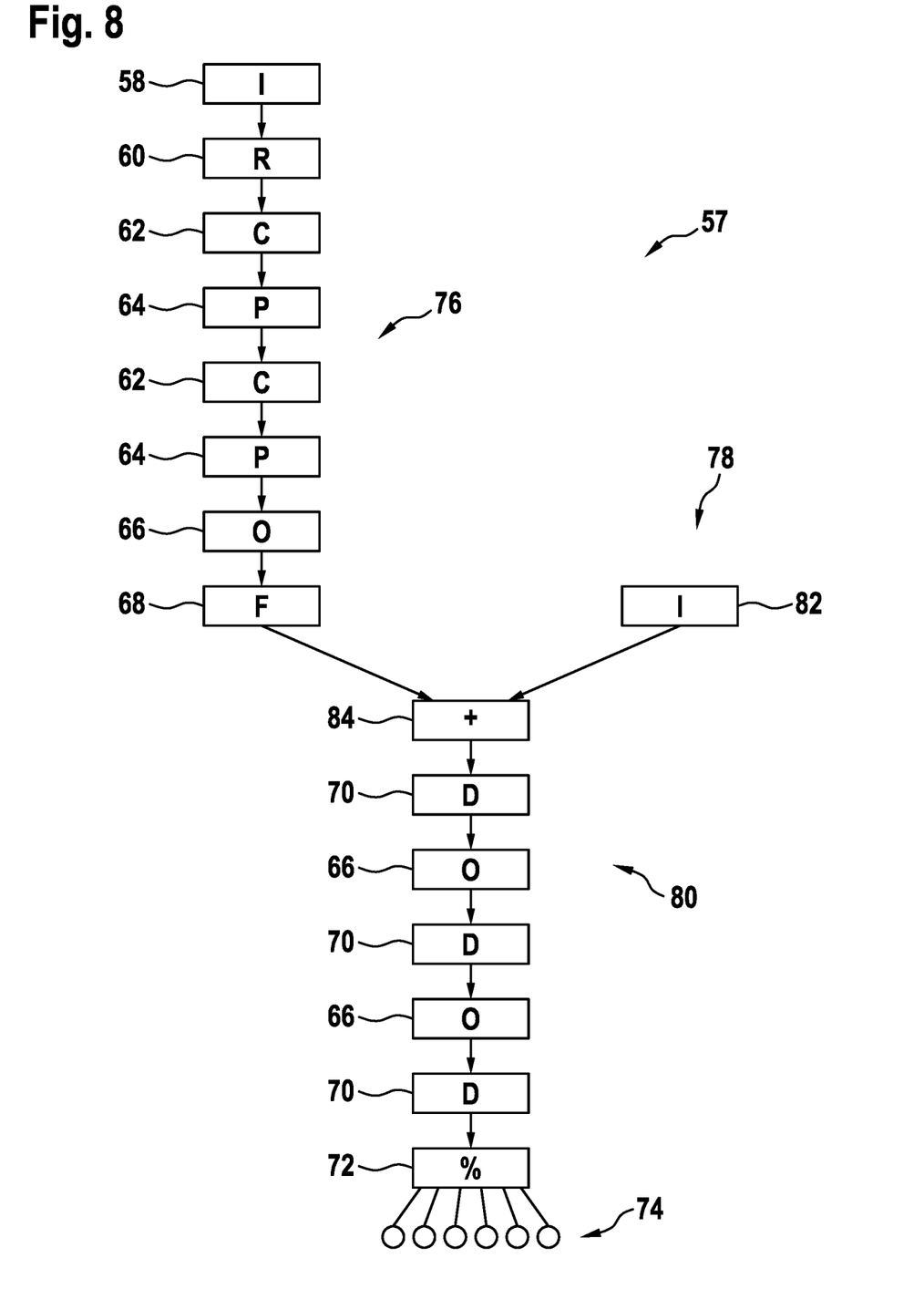
FIG. 8 schematically shows a further layout of a neural network used in an embodiment of the invention.

FIG. 8 schematically shows a further layout of a neural network 57, which may be used in an embodiment of the invention. In FIG. 8, the measurement data 56 and the liquid handling data 54 are input into different input layers 58, 82 of the neural network 57. Furthermore, the neural network 57 comprises a measurement data branch 76 and a liquid handling data branch 78.

The measurement data 56 is input into the input layer 58 of the measurement data branch 76 and the liquid handling data 54 is input into the input layer 82 of the liquid handling data branch 78.

The measurement data branch 76 may comprise at least two pairs of a convolutional layer 62 and a pooling layer 64. Furthermore, the measurement data branch 76 may comprise a reshape layer 60 after the input layer 58 and a flatten layer 68 at the end.

The liquid handling data branch 78 is composed solely of the input layer 82, in which the liquid handling data 54 is input.

The output of the measurement data branch 76 and the liquid handling data branch 78 is input in a concatenation layer 84, which concatenates the outputs, such as two vectors, together along a specific dimension.

The output of the concatenation layer 84 is input into a dense layer branch 80 of the neural network 57. The dense layer branch 80 may comprises at least two dense layers 70. Dropout layers 66 may be arranged between the dense layers 70. The output of the dense layer branch 80 is input into a probability layer 72, such as the one in FIG. 7.

It may be assumed that the neural network 57 of FIG. 7 also has a measurement data branch 76 or more general convolutional branch and a dense layer branch, which are connected in a row.

Figure 9:
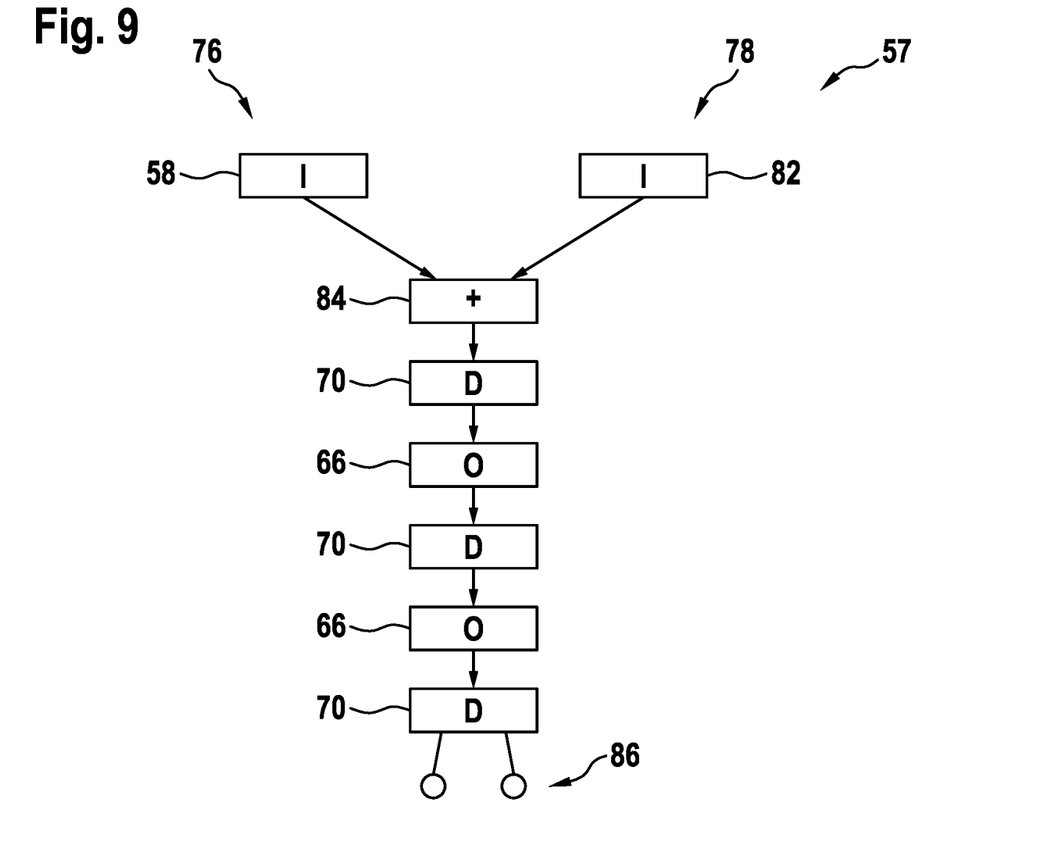
FIG. 9 schematically shows a further layout of a neural network used in an embodiment of the invention.

FIG. 9 schematically shows a further layout of a neural network 57, which may be used in an embodiment of the invention.

As the neural network of FIG. 8, the neural network 57 of FIG. 9 comprises a dense layer branch 80 into which an output of a measurement data branch 76 and an output of a liquid handling data branch 78 is input. However, the measurement data branch 76 and the liquid handling data branch 78 are composed of solely one input layer 58, 82.

Contrary to the neural networks 57 of FIGS. 7 and 8, the neural network 57 of FIG. 9 was trained to output one or more estimation value 86, estimating a physical quantity of the liquid handling procedure. For example, the estimation value 86 may be a dispensed volume or an aspirated volume. In this case, the training data has to be provided with the corresponding estimation values.

It may be possible that the neural networks 57 of FIGS. 7 and 8 output estimation value 86, as the neural network 57 of FIG. 9 and that the neural network 57 of FIG. 9 outputs probability values 74 as the neural networks 57 of FIGS. 7 and 8.

Returning to FIG. 2, in step S16, the assay and/or sample that has been processed with the laboratory automation system 10 may be marked with the one or more quality values 74, 86 determined by the neural network 57.

It also may be that the assay and/or sample, which has been processed with a liquid handling procedure that was performed erroneous as indicated by the quality value 74, 86 is discarded and/or that this assay and/or sample is processed for a second time.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit, such as an FPGA, may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for classifying liquid handling procedures with a control device of a laboratory automation system, the method comprising:
receiving measurement data encoding a measurement curve of measurements over time during a liquid handling procedure;
inputting the measurement data into a neural network;
inputting liquid handling data into the neural network, wherein the liquid handling data encode a configuration and/or setting of a laboratory automation system performing the liquid handling procedure;
calculating at least one quality value for the liquid handling procedure with the neural network; and
controlling the laboratory automation system with the at least one quality value by marking a liquid handling procedure as erroneous when the quality value is indicative of a failed liquid handling procedure,
wherein the neural network comprises at least one measurement data branch composed of at least one layer and a liquid handling data branch composed of at least one layer,
wherein the neural network comprises a dense layer branch into which an output of the measurement data branch and an output of the liquid handling data branch is input, and
wherein the measurement data is input into an input layer of the measurement data branch and the liquid handling data is input into an input layer of the liquid handling data branch.

2. The method of claim 1, wherein the measurement data comprise a vector of timely ordered measurement values.

3. The method of claim 1, wherein the measurement data branch comprises at least two convolutional layers.

4. The method of claim 1, wherein the dense layer branch comprises at least two dense layers.

5. The method of claim 1, wherein the neural network outputs a classification value, classifying the liquid handling procedure.

6. The method of claim 5, wherein the classification value indicates at least one of: correct procedure, clot, air aspiration, short sample, bubbles, foam, blocked tip, leakage.

7. The method of claim 1, wherein the neural network outputs an estimation value, estimating a physical quantity of the liquid handling procedure.

8. The method of claim 7, wherein the estimation value estimates at least one of: a dispensed volume, an aspirated volume.

9. The method of claim 1, wherein the liquid handling procedure comprises at least one of:
aspirating the liquid into a pipette by lowering a pressure in the pipette; and
dispensing a liquid in the pipette (14) and/or a dispense cannula by raising a pressure in the pipette and/or the dispense cannula.

10. A computer program for classifying liquid handling procedures, which, when being executed by a processor, is adapted to carry out the steps of the method of claim 1.

11. A computer-readable medium, in which a computer program according to claim 10 is stored.

12. A laboratory automation system, the system comprising:
a liquid handling arm for carrying a pipette and/or a dispense cannula;
a pump for changing a pressure in a volume connected to the pipette for aspiring and dispensing a liquid in the pipette;
a sensor device for performing measurements in the volume connected to the pipette; and
a control device for controlling the pump and for receiving measurement data from the sensor device;
wherein the control device is adapted for performing the method of one of claim 1.

13. The method of claim 1, further comprising:
discarding a result of the liquid handling procedure when the quality value is indicative of a failed liquid handling procedure.

14. The method of claim 1, further comprising:
repeating an assay and/or sample processing with the liquid handling procedure when the quality value is indicative of a failed liquid handling procedure.

* * * * *